United States Patent [19]

Kade et al.

[11] Patent Number: 4,783,127

[45] Date of Patent: * Nov. 8, 1988

[54] ANTI-LOCK BRAKE CONTROL SYSTEM

[75] Inventors: Alexander Kade, Grosse Pointe Woods; Harland G. Hopkins, Sterling Heights; Mutasium A. Salman, Troy, all of Mich.

[73] Assignee: General Motors Corporation, Detroit, Mich.

[*] Notice: The portion of the term of this patent subsequent to May 12, 2004 has been disclaimed.

[21] Appl. No.: 48,096

[22] Filed: May 8, 1987

Related U.S. Application Data

[63] Continuation of Ser. No. 789,576, Oct. 21, 1985, Pat. No. 4,664,453.

[51] Int. Cl.$^4$ .............................................. B60T 8/58
[52] U.S. Cl. .................................... 303/100; 303/104; 303/DIG. 4
[58] Field of Search ............... 303/100, 104, 111, 110, 303/109, DIG. 4; 364/426

[56] References Cited

U.S. PATENT DOCUMENTS

| 3,131,975 | 5/1964 | Smith et al. | 303/104 |
| 3,547,500 | 12/1970 | Riordan | 303/104 |
| 3,663,069 | 5/1972 | Perry et al. | 303/DIG. 4 |
| 3,744,852 | 7/1973 | Riordan | 303/DIG. 4 |
| 4,094,555 | 6/1978 | Byrne et al. | 303/100 |

FOREIGN PATENT DOCUMENTS 2205787 2/1972 Fed. Rep. of Germany.
2164094 6/1973 Fed. Rep. of Germany.

Primary Examiner—Marshall M. Curtis
Assistant Examiner—Alvin Oberley
Attorney, Agent, or Firm—Howard N. Conkey

[57] ABSTRACT

A brake control system is described that prevents a wheel lockup condition by identifying the brake pressure that produces the maximum possible braking effort during each brake pressure application period and applying a predetermined fraction of the identified pressure after an incipient wheel lockup condition is sensed. The predetermined fraction provides for adaptive adjustment of the brake pressure if the identified brake pressure is in error until a pressure is applied that produces substantially the maximum possible braking effort.

7 Claims, 4 Drawing Sheets

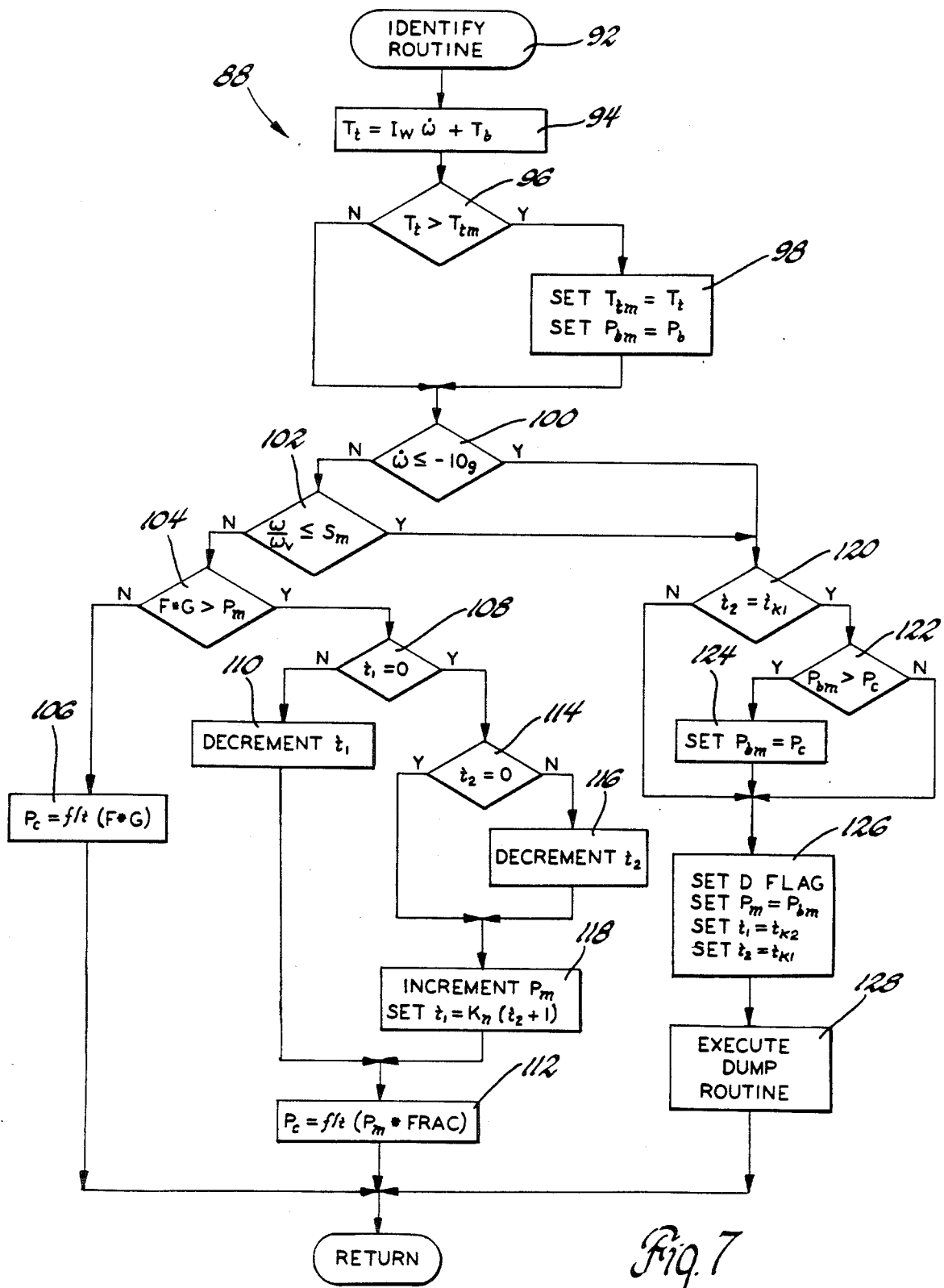

ANTI-LOCK BRAKE CONTROL SYSTEM

This is a continuation of application Ser. No. 789,576 filed on Oct. 21, 1985, now U.S. Pat. No. 4,664,453.

BACKGROUND OF THE INVENTION

This invention relates to an anti-lock control system for vehicle wheel brakes.

When the brakes of a vehicle are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. However, when the slip value becomes greater than the critical slip value, braking becomes unstable resulting in sudden wheel lockup, reduced vehicle stopping distance and a deterioration in the lateral stability of the vehicle.

Numerous wheel lock control systems have been proposed to prevent the wheels from locking up while being braked. Typically, these systems prevent the wheels from locking by releasing the applied brake pressure when an incipient wheel lockup condition is sensed. One criteria that is used to sense an incipient wheel lockup condition is excessive wheel deceleration. After release of the brake pressure, the wheel deceleration ceases and the wheels then accelerate toward vehicle speed. When the wheel speed has substantially recovered, brake pressure is reapplied. One criteria that is typically used to sense recovery is wheel acceleration falling below a specified low value. Reapplication of brake pressure results in the wheel again approaching lockup and the cycle is repeated. This form of wheel lock control system results in a rapid cycling of the brake pressure and the wheel slip value around the critical slip value to prevent wheel lockup. Ten Hertz is a typical cycling frequency.

SUMMARY OF THE INVENTION

As opposed to the foregoing systems for preventing wheel lockup during braking, the subject invention is directed toward a system which identifies the wheel brake pressure that results in the wheel slip being at the critical slip value and which produces the maximum braking force between the tire and the road surface. The brake pressure so identified is then applied to the wheel brake so as to substantially continuously establish the critical slip value between the wheel and the road surface resulting in the maximum possible braking effort.

In general, the subject invention repeatedly calculates the braking force between the wheel and the road surface during braking from system constants and measured values and stores the brake pressure corresponding in time to the peak calculated force. When an incipient wheel lockup is detected indicating that the critical wheel slip value and therefore the peak braking force between the wheel and road surface has been exceeded, the stored brake pressure that produced the peak braking force is reestablished to establish a braking condition n which the wheel slip is substantially at the critical slip value for the existing road-tire interface condition.

In one aspect of this invention, the braking pressure reestablished to produce the critical wheel slip value is automatically adjusted to compensate for changing brake system parameters and for other errors that may exist in the calculation of the braking force to provide for a system that self-adapts to those changes and errors.

DESCRIPTION OF THE DRAWINGS

The invention may be best understood by reference to the following description of a preferred embodiment and the drawings in which:

FIGS. 5 thru 8 are diagrams illustrating the operation of the engine controller of FIG. 4.

DESCRIPTION OF THE PREFERRED EMBODIMENT

Figure 1:
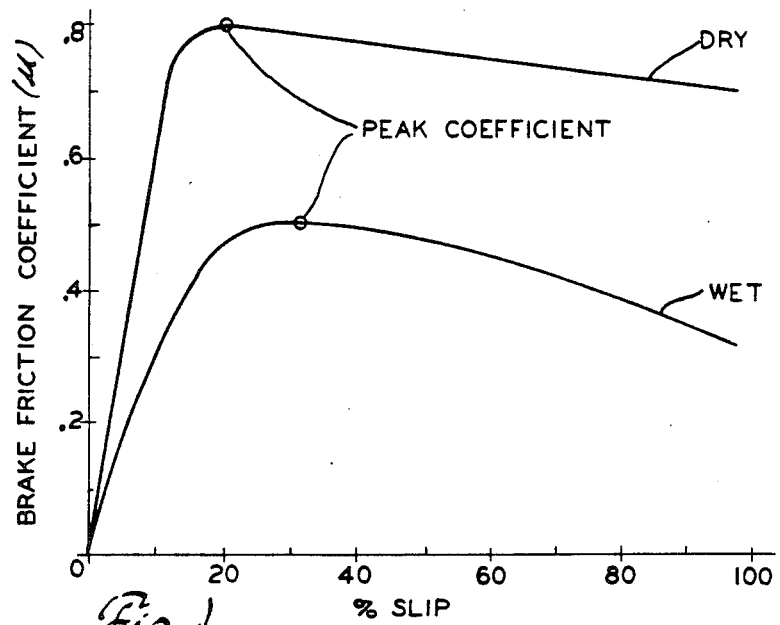
FIG. 1 is a diagram illustrating the brake force coefficient between a wheel and a road surface as a function of the percentage slip between the wheel and road surface for two road surface conditions.

A wheel under the influence of braking has two major torques acting on it: brake torque and tire torque. Brake torque arises from the application of brake pressure through the brake mechanism and tire torque is generated by the friction of the tire-road interface as wheel slip occurs.

Brake torque $T_b$ is assumed to be proportional to brake pressure $P_b$ with a known brake gain $K_b$ and is defined by the expression $$T_b = P_b K_b \quad (1)$$

Tire torque $T_t$ is related to the brake force coefficient $\mu$ between the tire and the road surface, the normal load N on the tire and the wheel rolling radius R and is defined by the expression $$T_t = \mu N R. \quad (2)$$

For the free body consisting of the brake, wheel, and tire, the equation of motion is $$I_w \dot{\omega} + T_b - T_t = 0 \quad (3)$$

where $I_w$ is the wheel moment of inertia and $\omega$ is the wheel angular acceleration. When the difference between the tire torque and the brake torque is positive, the wheel accelerates; and when negative, the wheel decelerates.

Rearranging expression 3, tire torque $T_t$ is defined as $$T_t = I_w \dot{\omega} + T_b. \quad (4)$$

As can be seen, the tire torque can be calculated from values that are either known or can be measured. The wheel moment of inertia $I_w$ and the brake gain $K_b$ are known values, the value of brake pressure $P_b$ can be measured and $\dot{\omega}$ can be determined by differentiating the value of wheel speed which can be measured.

The brake friction coefficient term $\mu$ of the tire torque $T_t$ is a nonlinear function of the magnitude of slip between the wheel and the road surface during braking and is dependent upon the road surface condition. FIG. 1 illustrates the brake friction coefficient $\mu$ as a function of percentage-wheel slip for two road surface conditions. For a given road surface, it can be seen that as wheel slip is increased in response to increased brake torque $T_b$, the brake friction coefficient $\mu$ and therefore the tire torque $T_t$ increases until a critical slip value at which the brake friction coefficient and the tire torque are at a maximum. A further increase in wheel slip results in a decrease in the brake friction coefficient and tire torque. The maximum tire torque resulting in a maximum braking effort for a given road surface is achieved when the brake torque $T_b$ produces the critical wheel slip value. When the braking effort produces a wheel slip exceeding the critical slip value, the braking operation becomes unstable and typically results in sudden wheel lockup which in turn results in increased stopping distance and a deterioration in the steering and lateral stability of the vehicle.

In general, the brake control system incorporating the principles of this invention identifies the value of the braking pressure $P_b$ that produces the maximum tire torque $T_t$. This is accomplished by continuously calculating the tire torque value $T_t$ of equation (4) during braking. Any time the calculated value is larger than any previously calculated value, the value of the braking pressure $P_b$ is stored so that the brake pressure producing the maximum tire torque is known. When an incipient wheel lock is detected, the brake pressure is dumped to allow the wheel speed to recover and the brake pressure is thereafter reapplied to the stored value to establish a braking condition in which the wheel slip is substantially at the critical slip value for the existing road surface condition. This results in substantially the maximum possible tire torque $T_t$ and minimum stopping distance for the road surface condition.

If for some reason, such as a change in the brake system parameters over time, there exists an error in the calculated tire torque which results in the storing and subsequent reapplication of an unstable brake pressure, the brake pressure is adaptively reduced until a stable pressure is identified that produces substantially the critical slip value and therefore the maximum braking effort. This is accomplished by establishing the reapplied brake pressure at a predetermined fraction of the stored brake pressure $P_b$ that corresponded in time to the maximum calculated value of tire torque $T_t$. If the resulting applied brake pressure results in a sensed incipient wheel lockup condition, the brake pressure next applied is again reduced by the fraction. The repeated reduction of the applied brake pressure by this predetermined fraction, such as 0.9, provides for self-adaptation to changing brake system parameters including changes in the coefficient of friction of the brake linings or for any errors in the coefficients utilized in the calculation of tire torque.

Figure 2:
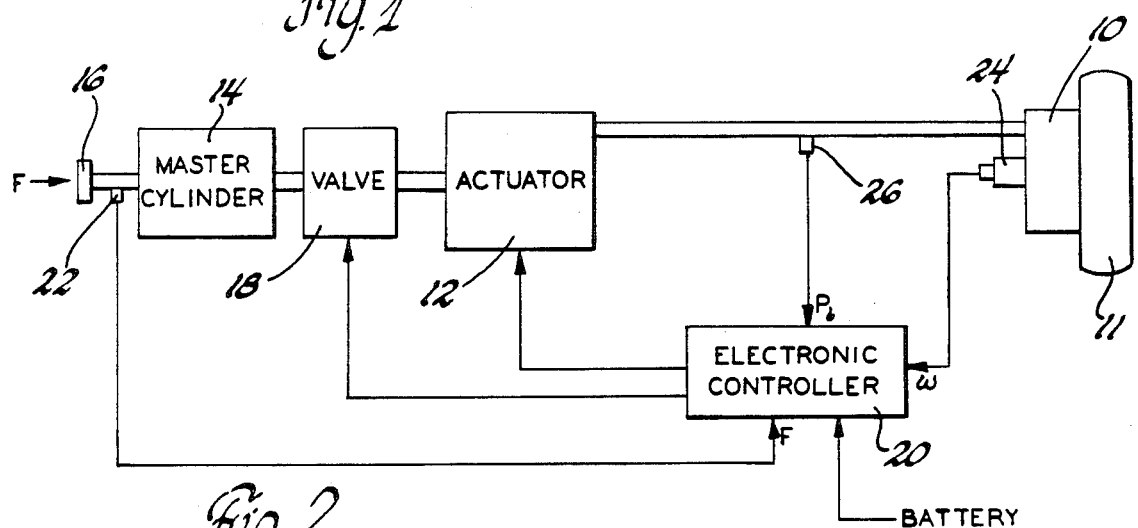
FIG. 2 is a general diagram of the braking system for controlling the brakes in accord with the principles of this invention.

A general overview of the wheel lock control system of this invention is illustrated in FIG. 2. The control of the brake of a single wheel is illustrated, it being understood that the control of the brakes of the remaining wheels of the vehicle are identical thereto. A standard wheel brake 10 for a wheel 11 is actuated by controlled hydraulic pressure from one of two sources. The primary source is a motor driven actuator 12 and the secondary source is a standard master cylinder 14 controlled directly by the vehicle brake pedal 16. A normally open electromagnetic valve 18 is energized when the actuator 12 is operative to control the hydraulic pressure to the brake 10 so as to decouple the master cylinder 14 and brake pedal 16 from the hydraulic pressure output of the actuator 12. This prevents pressure feedback to the vehicle operator while brake pressure is controlled by the actuator 12. When the electromagnetic valve 18 is deenergized, the hydraulic pressure to brake 10 may be modulated directly by the brake pedal 16 and master cylinder 14.

The valve 18 is deenergized only during limited vehicle operating conditions such as low vehicle speed or during failed conditions of the primary hydraulic pressure source to permit brake pressure modulation by the master cylinder 14. At all other times, the valve 18 is energized to decouple the master cylinder 14 from the braking system.

An electronic controller 20 is responsive to the outputs of a brake pedal force sensor 22 providing a signal that is a measure of the operator applied brake pedal force F, a wheel speed sensor 24 that provides a signal that is a measure of wheel speed $\omega$, and a pressure sensor 26 that provides a signal that is a measure of the hydraulic brake pressure $P_b$ applied to the brake 10 from the master cylinder 14 or the actuator 12. The electronic controller 20 is responsive to those signals to (a) energize the valve 18 when the wheel speed $\omega$ exceeds a value corresponding to a low vehicle speed such as 3 mph, (b) control the actuator 12 so as to apply a hydraulic pressure $P_b$ to the brake 10 that is proportional to the brake force F times a gain constant G for providing power assist during normal braking conditions, and (c) limit the pressure $P_b$ applied to the brake 10 to a value that results in the maximum possible tire torque $T_t$ for the road surface condition to prevent wheel lockup and to provide for the shortest possible stopping distance, lateral vehicle stability and controllable vehicle steering.

Figure 3:
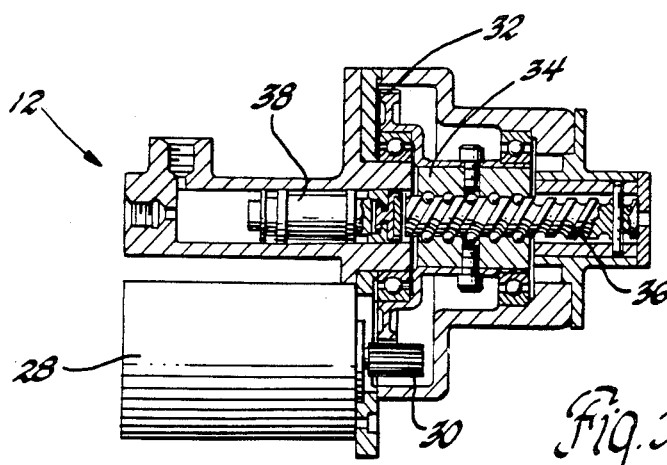
FIG. 3 is a longitudinal cross-sectional view of the actuator of FIG. 2 for modulating the brake pressure to prevent wheel lockup.

Referring to FIG. 3, the actuator 12 in the preferred embodiment includes a DC torque motor 28 whose output shaft drives an input gear 30 which in turn rotatably drives an output gear 32. The drive member 34 of a ball screw actuator is secured for rotation with the output gear 32. The drive member 34 engages and axially positions the driven member 36 of the ball screw actuator. The driven member 36 drives a piston 38 to control the hydraulic pressure output of the actuator 12. In summary, the torque output of the motor 28 is translated to a directly related hydraulic pressure $P_b$ output of the actuator 12 that is applied to the brake 10.

The actuator 12 may also take other forms. For example, it may take the form of a duty cycle modulated solenoid having an armature applying a controlled force to the piston 38. Additionally, the motor 28 current may be used as a measure of the brake pressure $P_b$ in place of the sensor 26 since the torque output of the motor 28 and therefore the hydraulic pressure $P_b$ is related to the motor current.

Figure 4:
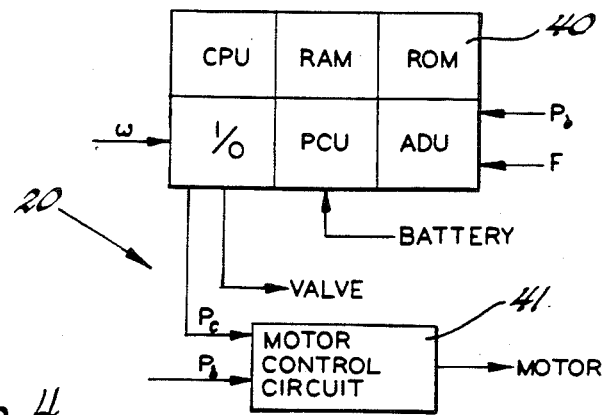
FIG. 4 is a diagram of the electronic controller of FIG. 2 that is responsive to brake system parameters for controlling the brake pressure to inhibit wheel lockup in accord with the principles of this invention.

As specifically illustrated in FIG. 4, the electronic controller 20 in the present embodiment takes the form of a digital computer 40 and a motor control circuit 41. The digital computer is standard in form and includes a central processing unit (CPU) which executes an operating program permanently stored in a read-only memory (ROM) which also stores tables and constants utilized in controlling the hydraulic pressure input to the brake 10. Contained within the CPU are conventional counters, registers, accumulators, flag flip flops, etc. along with a clock which provides a high frequency clock signal.

The computer 40 also includes a random access memory (RAM) into which data may be temporarily stored and from which data may be read at various address locations determined in accord with the program stored in the ROM. A power control unit (PCU) receives unbattery voltage and provides regulated power to the various operating circuits in the electronic controller 20.

The computer 40 further includes an input/output circuit (I/O) that in turn includes a discrete output section controlled by the CPU to provide a control signal to the valve 18. In controlling the brake 10, the computer outputs a digital signal to the motor control circuit 41 via the I/O representing a desired value of the hydraulic brake pressure. The motor control circuit 41 converts the digital signal representing the desired pressure to an analog signal which is compared with the actual measured value of the brake pressure $P_b$. By standard closed loop adjustment that may include both proportional and integral terms, the motor 28 current is controlled so that the actual measured brake pressure $P_b$ is made equal to the desired pressure.

The I/O also includes an input counter section which receives a pulse output from the wheel speed sensor 24 having a frequency representing wheel speed $\omega$. Wheel speed $\omega$ is then determined by counting clock pulses between wheel speed pulses.

An analog-to-digital unit (ADU) is included which provides for the measurement of analog signals. The analog signals representing conditions upon which the hydraulic brake pressure to the brake 10 is based are supplied to the ADU. In the present embodiment, those signals include the brake pressure value $P_b$ from the pressure sensor 26 and the output of the brake pedal force sensor 22 providing a measure of the pedal force F. The analog signals are sampled and converted under the control of the CPU and stored in ROM designated RAM memory locations.

Figure 5:
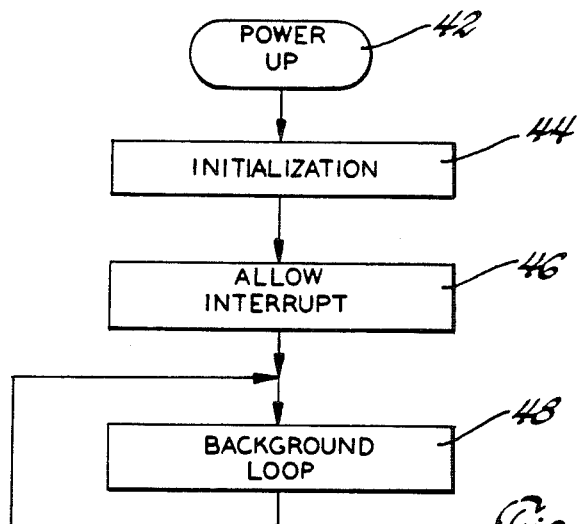

The operation of the electronic controller 20 in controlling the hydraulic brake pressure $P_b$ to the brake 10 in accord with the principles of this invention is illustrated in the FIGS. 5-8. Referring first to FIG. 5, when power is first applied to the system such as when the vehicle ignition switch is rotated to its "on" position, the computer program is initiated at point 42 and then proceeds to a step 44 where the computer 40 provides for system initialization. For example, at this step initial values stored in the ROM are entered into ROM designated RAM memory locations and counters, flags and timers are initialized.

After the initialization step 44, the program proceeds to a step 46 where the program allows interrupts to occur and then to a background loop 48 which is continuously repeated. This loop may include, for example, diagnostic routines. In the preferred embodiment of this invention, an interrupt is provided by the CPU at 5 millisecond intervals during which the routines for establishing the hydraulic brake pressure $P_b$ are executed.

Figure 6:
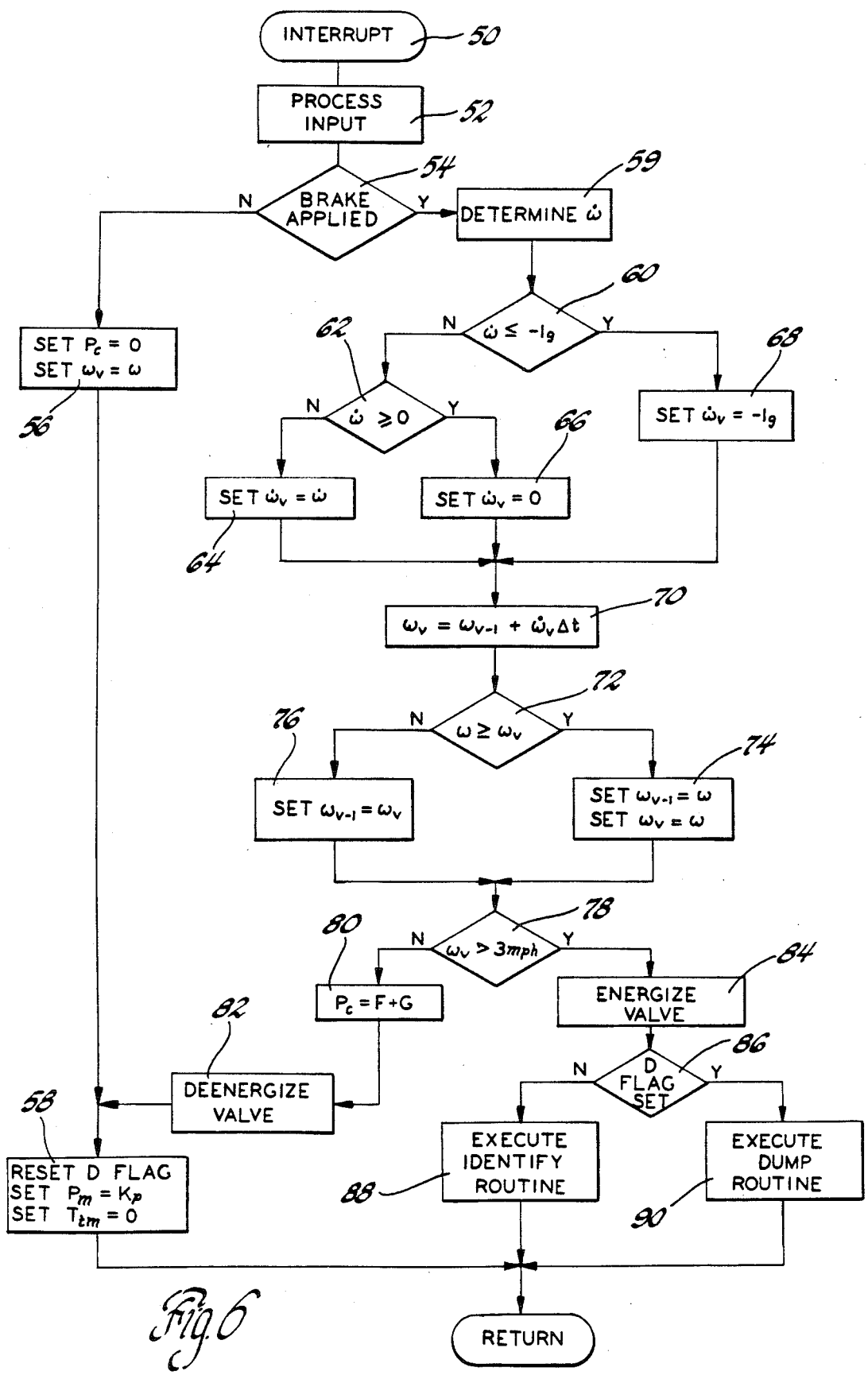

Referring to FIG. 6, the five millisecond interrupt routine for controlling the vehicle brake 10 is illustrated. This routine is entered at step 50 and proceeds to a step 52 where the last measured wheel speed $\omega$ is saved and the new values of wheel speed $\omega$, brake pedal force F and brake line pressure $P_b$ are read and stored in ROM designated RAM memory locations. Next, the program proceeds to a step 54 where it is determined whether or not the operator is commanding brake application. The brakes are considered applied if the value of the brake pedal force F is greater than zero. If the brakes are not applied, the program proceeds to a step 56 where a brake pressure command value $P_c$ is set equal to zero. Also at this step, the speed of the vehicle as represented by the speed $\omega_v$ of a hypothetical unbraked wheel is set equal to the wheel speed measured at step 52. Since the brakes are not applied, the wheel slip is substantially at zero so that the actual and hypothetical wheel speeds can be equated.

From step 56, the program proceeds to a step 58 where a D-flag is reset to condition the program to execute an identification routine (illustrated in FIG. 7) which identifies the brake pressure producing the critical wheel slip value and therefore the maximum possible braking effort and which establishes the identified brake pressure following the sensing of an incipient wheel lockup condition. As will be described, the D-flag is set when an incipient wheel lockup condition is sensed to condition the program to execute a dump routine (illustrated in FIG. 8) to release the brake pressure and allow the wheel speed to recover. Also at step 58, the maximum allowable brake line pressure $P_m$ is set equal to a calibration constant $K_p$ such as 1500 psi and a RAM memory location storing the value of the maximum calculated tire torque value $T_{tm}$ is set equal to zero. Thereafter, the program exits the 5 millisecond interrupt routine and returns to the background loop 48 of FIG. 5.

The foregoing steps 52 thru 58 are continuously repeated at 5 millisecond intervals as long as the vehicle operator does not command brake application. However, when a force F is applied to the brake pedal, the program proceeds from step 54 to a series of steps that provide an estimation of the value of vehicle speed $\omega_v$ as represented by the speed of a hypothetical unbraked wheel. It is noted that the initial value of $\omega_v$ was set equal to the actual wheel speed $\omega$ at step 56 prior to operation of the brake pedal 16. This series of steps begins at step 59 where the rate of change in wheel speed $\dot{\omega}$ is determined from the old value of wheel speed saved at step 52 and the new value stored at step 52. The determined rate of change of wheel speed is then compared with a constant deceleration of 1 g at step 60. The 1 g deceleration value represents the maximum possible vehicle deceleration. When wheel deceleration is less than 1 g, it is assumed that the vehicle is decelerating at the same rate as the wheel 11. If, however, the wheel deceleration exceeds 1 g, it is assumed that the vehicle deceleration remains at the maximum value of 1 g.

If the wheel deceleration is less than or equal to 1 g, the program proceeds from step 60 to a step 62 where $\dot{\omega}$ is compared to zero. If the comparison indicates wheel deceleration, the program proceeds to step 64 where the rate of change of vehicle speed $\dot{\omega}_v$ is set equal to the actual measured rate of change of wheel speed. If, however, the comparison at step 62 indicates no change in wheel speed or wheel acceleration, the program proceeds to a step 66 where the rate of change of vehicle speed $\dot{\omega}_v$ is set equal to zero.

Returning to step 60, if it is determined that the wheel deceleration is 1 g or greater, the program proceeds to a step 68 where is set equal to the maximum possible vehicle deceleration of 1 g.

From the respective steps 64, 66 or 68, the program proceeds to a step 70 where vehicle speed $\omega_v$ is estimated. This estimation is based on an initial value of vehicle speed $\omega_{v-1}$ determined during the previous execution of the interrupt routine and the rate of change of vehicle speed determined at step 64, 66 or 68 over the five millisecond interval $\Delta t$ between interrupt periods.

From step 70, the program proceeds to step 72 where the actual wheel speed $\omega$ measured at step 52 is compared to the vehicle speed $\omega_v$ determined at step 70. If the wheel speed is equal to or greater than the vehicle speed (which cannot occur during braking of the wheel), the value of vehicle speed is corrected at step 74 by setting the vehicle speed $\omega_v$ equal to wheel speed $\omega$ and the initial vehicle speed $\omega_{v-1}$ to be used at step 70 in the next execution of the interrupt routine is set equal to wheel speed $\omega$. If at step 72 the wheel speed $\omega$ is determined to be less than the vehicle speed $\omega_v$, the program proceeds to a step 76 where the initial vehicle speed $\omega_{v-1}$ to be used at step 70 during the next execution of the interrupt routine set equal to the value of vehicle speed determined at step 70.

Following step 74 or step 76, the program proceeds to a step 78 where the vehicle speed is compared to a calibration constant such as 3 mph. If the vehicle speed is less than 3 mph, the program proceeds to a step 80 where the commanded brake line pressure $P_c$ is set equal to the value of the brake pedal force F times a gain constant G for providing power assisted braking. Thereafter, the program proceeds to a step 82 where the valve 18 of FIG. 2 is deenergized and then to the step 58 previously described.

If the vehicle speed is greater than 3 mph, the program proceeds from step 78 to step 84 where the valve 18 is energized to decouple the master cylinder 14 from the actuator 12. Brake application is thereafter provided solely via the actuator 12 as controlled by the electronic controller 20. From step 84, the program proceeds to a step 86 where the state of the D-flag is sampled. If the D-flag is reset to condition the program to execute the identify routine, the program proceeds to a step 88 where the identify routine is executed.

If step 86 determines that the D-flag is set, the program is conditioned to execute a dump routine, and the program proceeds to a step 90 where the dump routine is executed. During this routine, the pressure to the brake 10 is released to allow the speed of the wheel 11 to recover from an incipient lockup condition. Following the steps 88 or 90, the program exits the 5 millisecond interrupt routine of FIG. 6 and returns to the background loop 48 of FIG. 5.

Referring to FIG. 7, the identify routine 88 of FIG. 6 is illustrated. This routine (A) provides for power assisted braking, (B) identifies the brake line pressure producing the critical wheel slip corresponding to the maximum possible braking force between the tire and the road surface, (C) senses an incipient wheel lockup condition and conditions the program to execute the dump routine to allow wheel recovery from the lockup condition, (D) reestablishes the brake line pressure to the identified pressure producing the critical slip value and (E) adaptively reduces the brake line pressure until a stable braking pressure is identified if the pressure originally identified results in unstable braking due to system parameter changes.

The identify routine is entered at point 92 and proceeds to a step 94 where the value of the tire torque $T_t$ is calculated in accord with the equation (4) from the wheel deceleration $\dot{\omega}$ determined at step 59, the brake line pressure $P_b$ measured at step 52 and the known values of wheel inertia $I_w$ and brake gain $K_b$. From step 94, the program proceeds to steps 96 and 98 that function to identify the brake pressure producing the maximum value of tire torque. At step 96, the tire torque $T_t$ calculated at step 94 is compared with the largest previously calculated value $T_{tm}$ stored in memory. If the value calculated at step 94 is greater than the stored value $T_{tm}$, the program proceeds to a step 98 where the stored value $T_{tm}$ is set equal to the larger value calculated at step 94. Also at this step, a stored value of brake line pressure $P_{bm}$ is set equal to the brake line pressure $P_b$ measured at step 52. Therefore, the stored value $P_{bm}$ represents the brake line pressure corresponding in time to the maximum calculated value of tire torque stored at step 98.

The foregoing sequence of steps 96 and 98 are repeated with each execution of the identify routine as long as the tire torque is increasing so that the brake line pressure resulting in the maximum calculated value of tire torque is always known. If step 96 should determine that the calculated value of tire torque $T_t$ is less than the stored maximum calculated value $T_{tm}$, step 98 is bypassed. This will occur when the brake pressure $P_b$ results in a wheel slip that exceeds the critical value which in turn results in a decrease in the tire torque. The stored value of brake pressure $P_{bm}$ then represents the brake line pressure establishing the critical wheel slip value and therefore the maximum braking effort. As will be described, this stored brake line pressure $P_{bm}$ is utilized after an incipient wheel lock condition is detected to reestablish a braking condition that produces substantially the critical wheel slip value.

The program next determines whether or not an incipient wheel lock condition exists as represented by excessive wheel deceleration or excessive wheel slip. At step 100, the rate of change in wheel speed determined at step 59 is compare with a deceleration reference value such as 10 g which, if exceeded, indicates that braking has become unstable and an incipient wheel lockup condition exists. If step 100 does not detect an incipient wheel lockup condition, the program proceeds to step 102 where the ratio $\omega/\omega_v$ is compared with a reference value $S_m$ which represents a wheel slip value that exceeds the largest possible critical wheel slip value for any road surface condition. A ratio less than $S_m$ indicates that braking has become unstable and an incipient wheel lockup condition exists.

If neither of the steps 100 and 102 detects an incipient wheel lockup condition, the program proceeds to a step 104 where the value of the operator requested brake pressure that is equal to the applied pedal force F times the power assist gain factor G is compared with a maximum allowable brake line pressure $P_m$. If the product is less than the maximum value, the program proceeds to a step 106 where the commanded brake pressure value $P_c$ is adjusted toward the operator requested pressure in accord with a first order lag filter equation to provide power assisted braking. Thereafter, the program exits the identify routine and returns to the background loop 48.

If at step 104 it is determined that the operator requested brake pressure is greater than the maximum allowable pressure $P_m$, the program proceeds to a pressure ramp routine where, through repeated executions of the identify routine, the maximum allowable brake pressure $P_m$ and the commanded brake line pressure $P_c$ are ramped up until step 104 detects that the maximum allowable brake pressure $P_m$ has become greater than the operator requested pressure or, if the operator requested brake pressure results in an unstable braking condition, until the commanded brake pressure results in an incipient wheel lockup condition at which time the brake pressure establishing the critical slip value has been identified by the steps 96 and 98. As will be described, the brake pressure so identified is then used to reestablish the commanded brake pressure after the wheel recovers from the incipient lockup condition. The result of the ramping of the brake pressure is a periodic low frequency (such as 2 Hz) reidentification of the brake pressure producing the critical wheel slip value. This enables the system to adapt to increasing values of the brake friction coefficient resulting from changes in the tire-road surface interface.

The routine for ramping the brake pressure RAM timing register is compared to zero. The initial value of time $t_1$ establishes a delay in the ramping of the commanded brake pressure $P_c$. Thereafter, the time $t_1$ functions in establishing the ramp rate. If the time $t_1$ is greater than zero, the program proceeds to a step 110 where the time $t_1$ is decremented. Thereafter, at step 112, the program proceeds to adjust the commanded brake pressure $P_c$ toward a predetermined fraction of the maximum allowable brake pressure $P_m$ in accord with a first order lag filter equation. By setting the maximum allowable brake pressure $P_m$ to the stored pressure $P_{bm}$ after an incipient wheel lockup condition is sensed (as will be described), the commanded pressure established at step 112 will be the predetermined fraction of the pressure producing the critical wheel slip. In one embodiment, the predetermined fraction is 0.9 so that the resultant brake pressure produces substantially the critical wheel slip value.

As long as an incipient wheel lock condition is not detected and the operator requested brake pressure is greater than the maximum allowable brake line pressure $P_m$, the steps 108 thru 112 are repeated at the five millisecond interrupt interval until $t_1$ has been decremented to zero. After $t_1$ has been decremented to zero, the program proceeds from step 108 to step 114 where the time $t_2$ in a RAM timing register is compared to zero. If the time $t_2$ is greater than zero, the program proceeds to a step 116 where the time $t_2$ is decremented.

Following step 116 or step 114, the program proceeds to a step 118 where the maximum allowable brake pressure $P_m$ is incremented and the time t is set equal to $K_n(t_2+1)$. Thereafter, the steps 114 thru 118 will be bypassed upon repeated executions of the identify routine until $t_1$ is again decremented to zero. From this it can be seen that the maximum allowable brake pressure $P_m$ is periodically incremented at intervals determined by $K_n$ and $t_2$. When $t_2$ is decremented to zero, the maximum allowable brake line pressure $P_m$ is incremented with each $K_n$ executions of the identify routine.

Following step 118, the program proceeds to step 112 where the commanded brake line pressure $P_c$ is again set as previously described. Repeated executions of the foregoing steps function to increase the commanded brake pressure $P_c$ exponentially. This increase will be continued until (A) an incipient wheel lock condition is forced so as to force a reidentification of the brake pressure producing the critical slip value via the steps 96 and 98 or (B) the operator requested brake pressure becomes less than the maximum allowable pressure $P_m$.

If the commanded brake pressure $P_c$ is increased to a point resulting in the wheel slip value becoming greater than the critical slip value, the wheels then quickly approach a lockup condition. This incipient wheel lock condition is detected as previously described at step 100 or step 102. When the incipient wheel lockup condition is detected, the brake line pressure $P_{bm}$ in memory at that time is the brake line pressure producing the critical wheel slip value and therefore the maximum possible tire torque.

After a wheel lockup condition has been sensed, the program proceeds to a step 120 where the time $t_2$ is compared with a constant $t_{k1}$. As will be seen, these two values will be equal only if a wheel lockup condition is sensed within a predetermined time $t_{k2}$ (such as 500 ms) after the brake pressure is reestablished after recovery from an incipient wheel lockup condition. A wheel lockup occurring within this period after reapplication of the brake pressure implies the application of an unstable brake pressure producing an incipient wheel lockup condition. If this condition exists, the program proceeds to a step 122 where the brake pressure $P_{bm}$, stored at step 98 and identified as the pressure establishing the critical wheel slip value, is compared with the commanded brake pressure $P_c$ which resulted in the incipient wheel lockup condition. If greater, the program proceeds to a step 124 where the stored value of $P_{bm}$ is corrected to the commanded pressure $P_c$. This condition represents an error in the calculation of the tire torque either through changes in the brake line coefficients or errors in various constants used in the determination of the calculation of the tire torque $T_t$. Since the brake line pressure producing the critical slip value can never be greater than the commanded brake line pressure $P_c$ that resulted in an incipient wheel lock condition, the value of $P_{bm}$ is reduced to the value of $P_c$ causing the incipient wheel lock condition.

From step 120 if the time $t_2$ is not equal to $t_{k1}$, from step 122 if $P_{bm}$ is less than $P_c$, or from step 124, the program proceeds to a step 126 where the D-flag is set to condition the program to execute the dump routine and certain initial conditions for reapplication of brake pressure are established. The initial conditions include setting the maximum allowable brake pressure $P_m$ equal to the stored value of brake pressure $P_{bm}$ (the brake pressure identified as producing the critical wheel slip value), setting the time $t_1$ equal to the constant $t_{k2}$ and setting the time $t_2$ equal to the constant $t_{k1}$. The program next proceeds to a step 128 where the dump routine is executed. Thereafter, during executions of the 5 ms interrupt routine of FIG. 6, the identify routine is bypassed via the step 86 and the dump routine 90 is executed until the D-flag is again reset.

Figure 8:
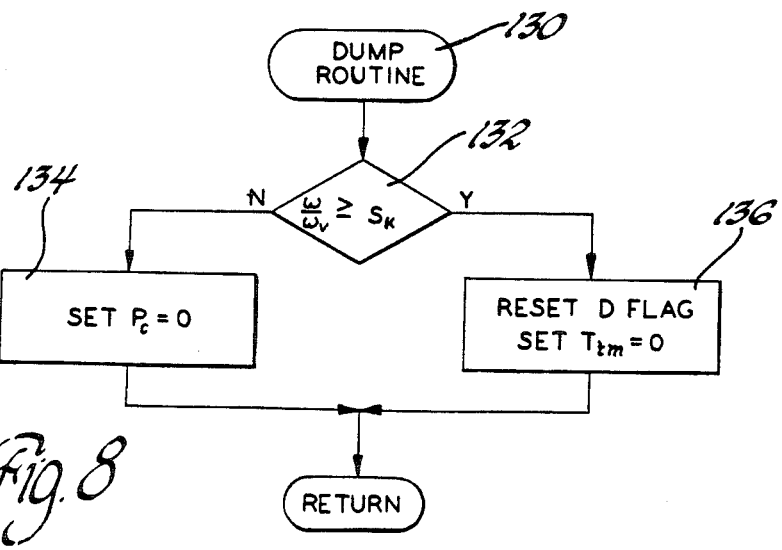

The dump routine executed at step 128 of the identify routine of FIG. 7 and at step 90 of the interrupt routine of FIG. 6 is illustrated in FIG. 8. This routine is entered at point 130 and proceeds to step 132 where wheel slip represented by the ratio of wheel speed $\omega$ to the speed $\omega_v$ of the hypothetical unbraked wheel is compared to a constant $S_k$ representing wheel speed approaching vehicle speed. $S_k$ may be, for example, 0.9 representing a wheel slip of 10 percent. If the ratio is less than $S_k$, the program proceeds to a step 134 where the commanded brake pressure $P_c$ is set to zero to allow the wheel speed to recover from the incipient wheel lockup and toward vehicle speed. When step 132 detects wheel speed recovery, the program proceeds from step 132 to a step 136 where the D-flag is reset to condition the program to execute the identify routine of FIG. 7. Also at this step, the maximum value of calculated tire torque $T_{tm}$ is set to zero so that the identify routine is conditioned to reidentify the brake pressure establishing the critical wheel slip value. The program then exits the dump routine of FIG. 8 and returns to the background loop 48.

During the following executions of the 5 millisecond interrupt routine of FIG. 6, the program executes the identify routine at step 88 until the D-flag is again set at step 126 after an incipient wheel lockup condition is sensed.

A brief summary of operation will now be described. At step 58 prior to the operator applying the vehicle brakes and at step 136 prior to brake pressure being reapplied after being released by the dump routine of FIG. 8, the stored maximum value $T_{tm}$ of calculated tire torque is set to zero so that prior to each application of brake pressure, the identify routine is conditioned to identify the brake pressure corresponding in time to the maximum calculated tire torque $T_{tm}$.

First it is assumed that there are no errors in the coefficients and values used in the calculation of tire torque $T_t$ in step 94 and that the tire-road surface interface conditions do not change during braking. As the commanded brake pressure $P_c$ is increased via steps 104 and 106 or ramped up via the steps 104 and steps 108 through 118, the stored brake pressure value $P_{bm}$ is continually updated with each increasing calculated value of tire torque.

When an incipient wheel lockup condition is sensed at step 100 or 102, the stored value of $P_{bm}$ is the brake pressure that resulted in the wheel slip being at the critical value and which produced the maximum possible braking effort for the existing tire-road interface condition. The stored value of $P_{bm}$ is unaffected by steps 120 through 124 since there were no errors in the calculated value of tire torque so that the value of $P_{bm}$ could never exceed the commanded brake pressure $P_c$. The maximum allowable brake pressure $P_m$ is then set equal to the value of $P_{bm}$ at step 126.

The D-flag is then set at step 126 after which the dump routine of FIG. 8 is repeated during each 5 ms interrupt to release the brake pressure to allow the wheel speed to recover. When the wheel speed has recovered, the D-flag is reset at step 136 so that the identify routine is then executed during each 5 ms interrupt. When executed, the identify routine reapplies the brake pressure at step 112 to the predetermined fraction of the maximum allowable brake pressure $P_m$. Recalling that $P_m$ was set equal to the value $P_{bm}$ that established the critical wheel slip value, the brake pressure reapplied is the predetermined fraction of the pressure establishing the critical wheel slip value. Since the fraction, which provides the adaptive feature of this invention, is typically large, such as 0.9, the brake pressure reapplied results in stable braking while at a wheel slip value substantially equal to the critical wheel slip value. After the time $t_{k2}$ (the initial value of $t_1$ set at step 126) which is typically 500 ms, the brake pressure is slowly ramped until an incipient wheel lock condition is again detected. While the brake pressure is being reapplied and thereafter ramped, the steps 96 and 98 are functioning to reidentify and store the brake pressure producing the critical wheel slip value.

The foregoing cycle is continually repeated as long as the operator requested pressure is greater than the maximum allowable pressure $P_m$. The cycle time is slow (less than 2 Hz) so that the wheel slip is substantially continuously controlled at the critical value.

If the road surface friction coefficient should increase while the brake pressure is being limited to prevent wheel lockup, the system automatically adapts to the change via the brake pressure ramp-up function provided by the steps 108 through 118. By ramping the brake pressure, the system is caused to reidentify the brake pressure producing the critical wheel slip value and in so doing, adapts to the change in the tire-road surface interface.

If the road surface friction coefficient should decrease while the brake pressure is being limited to prevent wheel lockup, the commanded brake pressure $P_c$ becomes excessive resulting in the wheel decelerating toward lockup. This incipient lockup condition is sensed at step 100 or 102 and the brake pressure released and subsequently reapplied as previously described. During reapplication of the brake pressure, steps 96 and 98 will reidentify the brake pressure producing the maximum calculated braking effort for the new tire-road surface interface condition as the wheel decelerates again toward lockup. This pressure (reduced by the fraction at step 112) is then applied as previously described after the brake pressure is next released in response to the sensed incipient wheel lockup.

The operation of the system in adapting to error in the identification of the brake pressure establishing the critical wheel slip will now be described. Over a period of time, changes may occur in the brake system parameters that could result in an unstable brake pressure being identified as the pressure establishing the critical wheel slip value. When this pressure is then applied after the wheel has recovered, the wheel immediately begins to decelerate toward lockup. Without correction, the brake pressure would rapidly cycle between pressure release and pressure apply. One of the brake system parameters that may change over time to produce the above result is the brake gain $K_b$ used in calculating brake torque $T_b$ in equation (4) above. This gain is affected, for example, by changes in the coefficient of friction of the brake linings in the brake 10.

By setting the maximum brake pressure $P_m$ equal to the stored brake pressure value $P_{bm}$ at step 126 and, after wheel speed recovery, by setting the commanded brake pressure $P_c$ to the predetermined fraction of $P_m$, the commanded brake pressure $P_c$ will be repeatedly stepped down by the fraction as the system cycles between brake pressure release and pressure apply until the commanded pressure $P_c$ becomes equal to or less than the value producing the critical wheel slip value. For example, if the predetermined fraction of the value of $P_{bm}$ stored by the identify routine is an unstable brake pressure due to errors such as above described, the resulting brake command pressure $P_c$ established at step 112 will cause an incipient wheel lockup condition at least within the delay period $t_{k2}$ previously described. The stored value $P_{bm}$ of the brake pressure at the time the incipient wheel lockup is sensed cannot be greater than the command pressure $P_c$. Therefore, the maximum allowable brake pressure $P_m$ set at step 126 is less than the prior maximum allowable pressure by at least the amount determined by the predetermined fraction. When the wheel speed has recovered via the dump routine, the new commanded brake pressure $P_c$ is set to the predetermined fraction of the new value of $P_m$. This new command pressure value $P_c$ is therefore at least less than the value of $P_c$ in the prior cycle by an amount determined by the predetermined fraction. If the new command pressure $P_c$ is still an unstable pressure, the cycle will be repeated until the command pressure has been repeatedly reduced by the fraction to a stable pressure that establishes substantially the critical wheel slip value.

The steps 122 and 124 further function to reduce the brake pressure reapplied in any cycle where the relationship between the stored pressure $P_{bm}$ and the command pressure $P_c$ represents an unstable brake pressure condition. Once a stable pressure has been identified by the above sequence, the system will not cycle again until expiration of the time period $t_{k2}$ via steps 108 and 110 and thereafter the command pressure $P_c$ is ramped to an unstable pressure by the steps 108 through 118 to force a reidentification of the pressure producing the critical wheel slip value.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. A wheel lock control system for limiting the brake pressure applied to the brakes of a vehicle wheel traveling over a road surface, the system comprising:

means for determining the tire torque tending to accelerate the wheel during the application of brake pressure;

means for storing a valve representative of the brake pressure corresponding in time to the maximum determined tire torque;

means for detecting an incipient wheel lockup condition resulting from the valve of slip between the wheel and the road surface exceeding a critical slip value; and means for establishing the brake pressure following a detected incipient wheel lockup condition at a value having a predetermined relationship to the brake pressure represented by the stored value.

2. A wheel lock control system for limiting the brake pressure applied to the brakes of a vehicle wheel traveling over a road surface, the system comprising:

means for determining the tire torque tending to accelerate the wheel during the application of brake pressure;

means for storing a value representing the brake pressure corresponding in time to the maximum determined tire torque during periods of application of brake pressure;

means for detecting an incipient wheel lockup condition resulting from the value of slip between the wheel and the road surface exceeding a critical slip value;

means for lowering the brake pressure in response to a detected incipient wheel lockup condition to allow wheel speed recovery; and means for reestablishing brake pressure following wheel speed recovery to a value having a predetermined relationship to the brake pressure represented by the stored value.

3. The method of limiting the brake pressure applied to the brakes of a vehicle wheel traveling over a roadway comprising the steps of:

determining the tire torque tending to accelerate the wheel during the application of brake pressure;

storing a value representing the brake pressure corresponding in time to the maximum determined tire torque following each application of brake pressure;

detecting an incipient wheel lockup condition resulting from the value of slip between the wheel and the road surface exceeding a critical slip value; and reapplying the brake pressure following a detected incipient wheel lockup condition to a value that is a predetermined relationship to the brake pressure represented by the last stored value.

4. The method of limiting the brake pressure applied to the brakes of a vehicle wheel traveling over a roadway comprising the steps of:

determining the tire torque tending to accelerate the wheel during the application of brake pressure;

storing a value representing the brake pressure corresponding in time to the maximum determined tire torque following each application of brake pressure;

detecting an incipient wheel lockup condition resulting from the value of slip between the wheel and the road surface exceeding a critical slip value;

lowering the brake pressure in response to a detected incipient wheel lockup condition to allow wheel speed recovery; and reapplying brake pressure following wheel speed recovery to a value that is predetermined relationship to the brake pressure represented by the last stored value.

5. A system for controlling the brake applied to the brakes of a wheel traveling over a road surface to limit the wheel slip between the wheel and the road surface, the system comprising, in combination:

means for determining the value of tire torque resulting from the tire and road interface;

means for storing a value representative of the brake pressure corresponding in time to the maximum determined value of tire torque;

means for determining when the value of slip between the tire and road surface exceeds a critical slip value; and means responsive to the determination of a slip value exceeding the critical slip value for reestablishing the brake pressure to a value related to the stored value to establish a wheel slip value producing substantially the peak value of tire torque.

6. A system for controlling the brake pressure applied to the brakes of a wheel traveling over a road surface to limit the wheel slip between the wheel and the road surface, the system comprising, in combination:

means for determining the value of tire torque resulting from the tire and road interface; and means for cyclically (A) storing a value representative of the brake pressure corresponding in time to the maximum determined value of tire torque, (B) determining when the value of slip between the tire and road surface exceeds a critical slip value, (C) reestablishing the brake pressure to a value related to the stored value to establish a wheel slip value producing substantially the peak value of tire torque and (D) ramping the brake pressure in direction tending to increase the value of slip between the tire and road surface, whereby the slip between the tire and road surface is maintained substantially at the value resulting in the peak tire torque value.

7. A method for controlling the brake pressure applied to the brakes of a wheel traveling over a road surface to limit the wheel slip between the wheel and the road surface, the method comprising:

determining the value of tire torque resulting from the tire and road interface;

storing a value representative of the brake pressure corresponding in time to the maximum determined value of tire torque;

determining when the value of slip between the tire and road surface exceeds a critical slip value; and reestablishing the brake pressure following the determination of the value of slip exceeding a critical slip value to a value related to the stored value to establish a wheel slip value producing substantially the peak value of tire torque.

* * * * *